United States Patent
Osterberg et al.

(10) Patent No.: US 6,804,954 B2
(45) Date of Patent: Oct. 19, 2004

(54) MOTORCYCLE EXHAUST SYSTEM

(75) Inventors: Timothy R. Osterberg, Hubertus, WI (US); Philip H. Pierce, West Bend, WI (US); William P. Pari, Waukesha, WI (US); Stacy L. Smith, Oconomowoc, WI (US)

(73) Assignee: Buell Motorcycle Company, East Troy, WI (US)

( * ) Notice: Subject to any disclaimer, the term of this patent is extended or adjusted under 35 U.S.C. 154(b) by 22 days.

(21) Appl. No.: 10/180,911

(22) Filed: Jun. 26, 2002

(65) Prior Publication Data

US 2004/0000140 A1 Jan. 1, 2004

(51) Int. Cl.$^7$ ................................................ F02B 27/02
(52) U.S. Cl. ............................. 60/313; 60/312; 60/314; 60/323
(58) Field of Search ........................ 60/312, 313, 314, 60/322, 323, 324

(56) References Cited

U.S. PATENT DOCUMENTS

| | | | | | |
|---|---|---|---|---|---|
| 3,726,084 | A | * | 4/1973 | Meier | ........................ 60/605.1 |
| 4,731,995 | A | * | 3/1988 | McFarland, Jr. | ............. 60/313 |
| 5,216,883 | A | * | 6/1993 | Flugger | ........................ 60/313 |
| 5,471,835 | A | * | 12/1995 | Friedman | ..................... 60/293 |
| 6,247,305 | B1 | * | 6/2001 | Bassani | ....................... 60/312 |
| 6,478,340 | B1 | * | 11/2002 | Butler | ..................... 285/131.1 |
| 6,564,767 | B1 | * | 5/2003 | Reese | .................... 123/184.53 |

* cited by examiner

*Primary Examiner*—Binh Q. Tran
(74) *Attorney, Agent, or Firm*—Micheal Best & Friedrich LLP

(57) ABSTRACT

An exhaust system for use with a four-stroke engine having first and second cylinders. The cylinders generate exhaust pulses at uneven time intervals with respect to each other. The exhaust system includes a muffler and first and second exhaust pipes that communicate between the mufflers and the first and second cylinders, respectively. The first and second pipes being sized and shaped to deliver the exhaust pulses to the muffler at even time intervals with respect to each other.

8 Claims, 4 Drawing Sheets

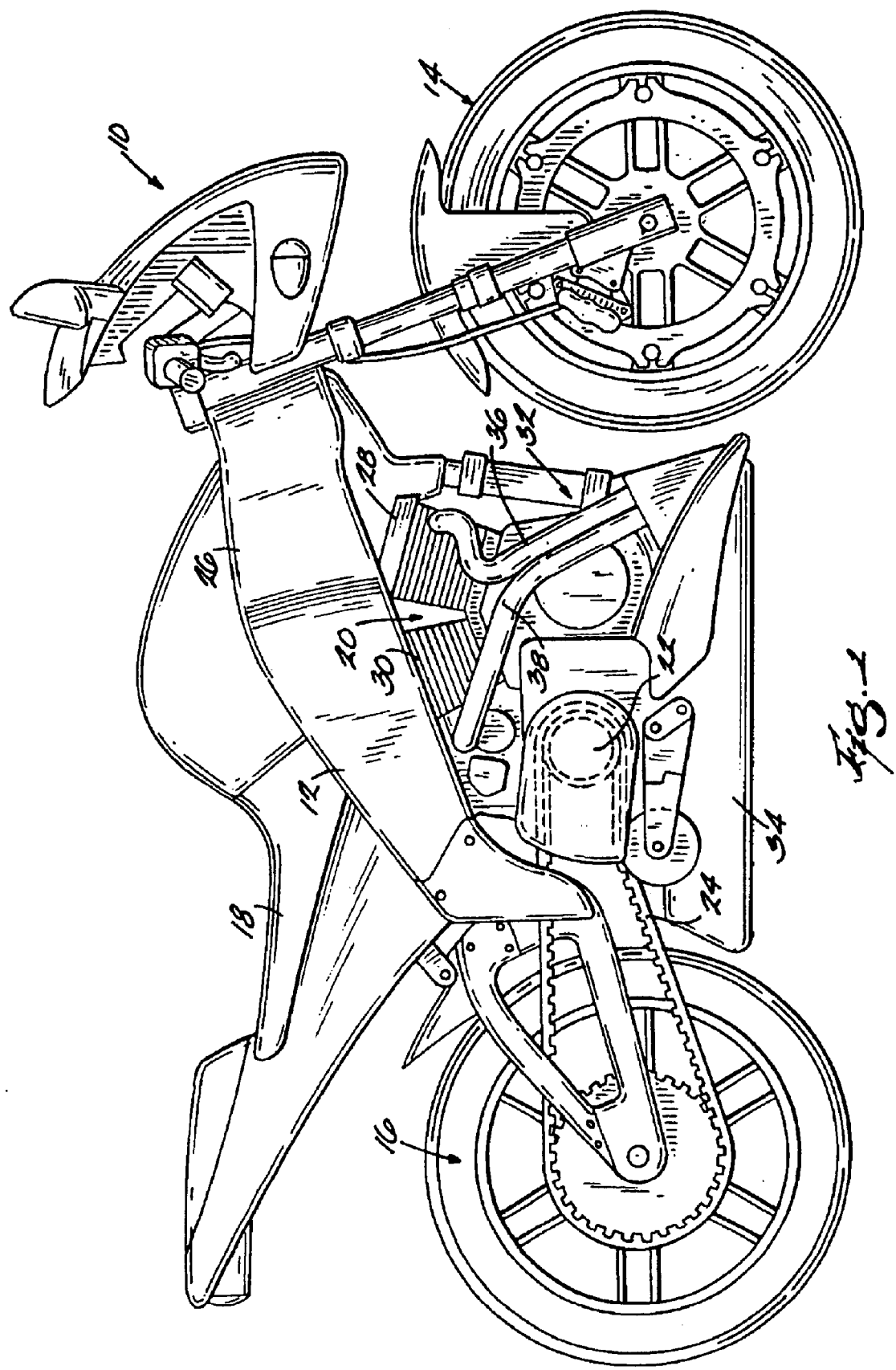

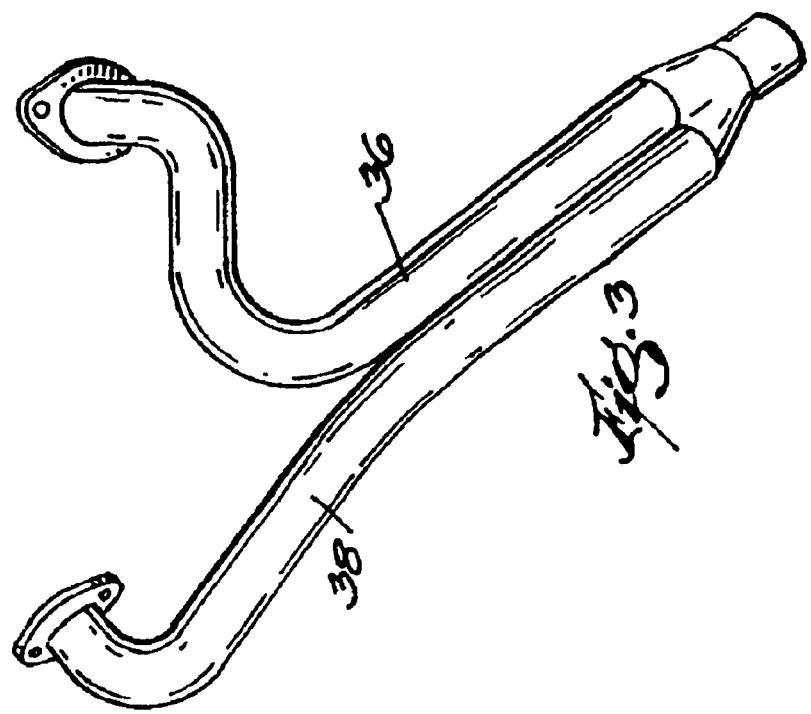
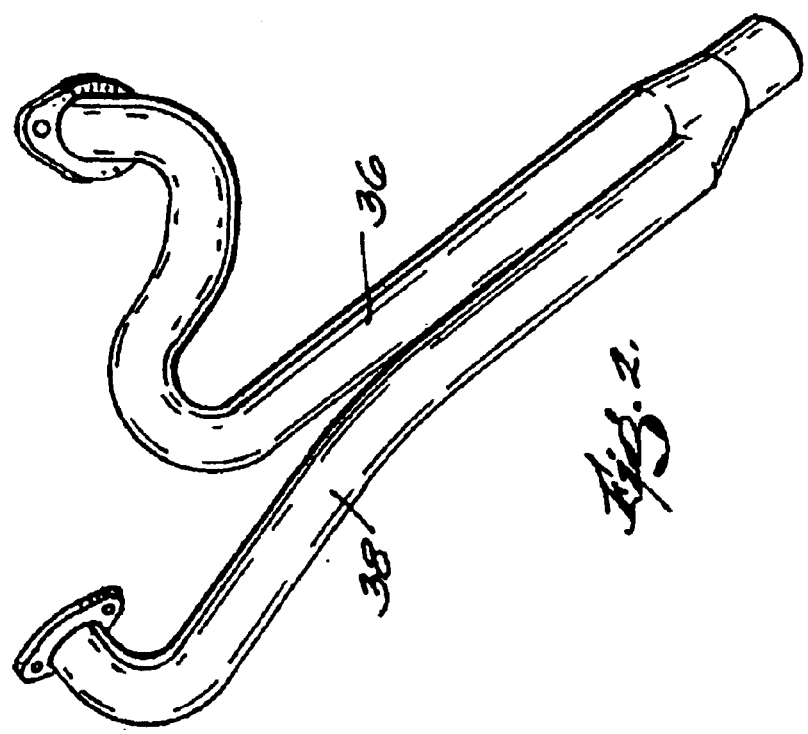

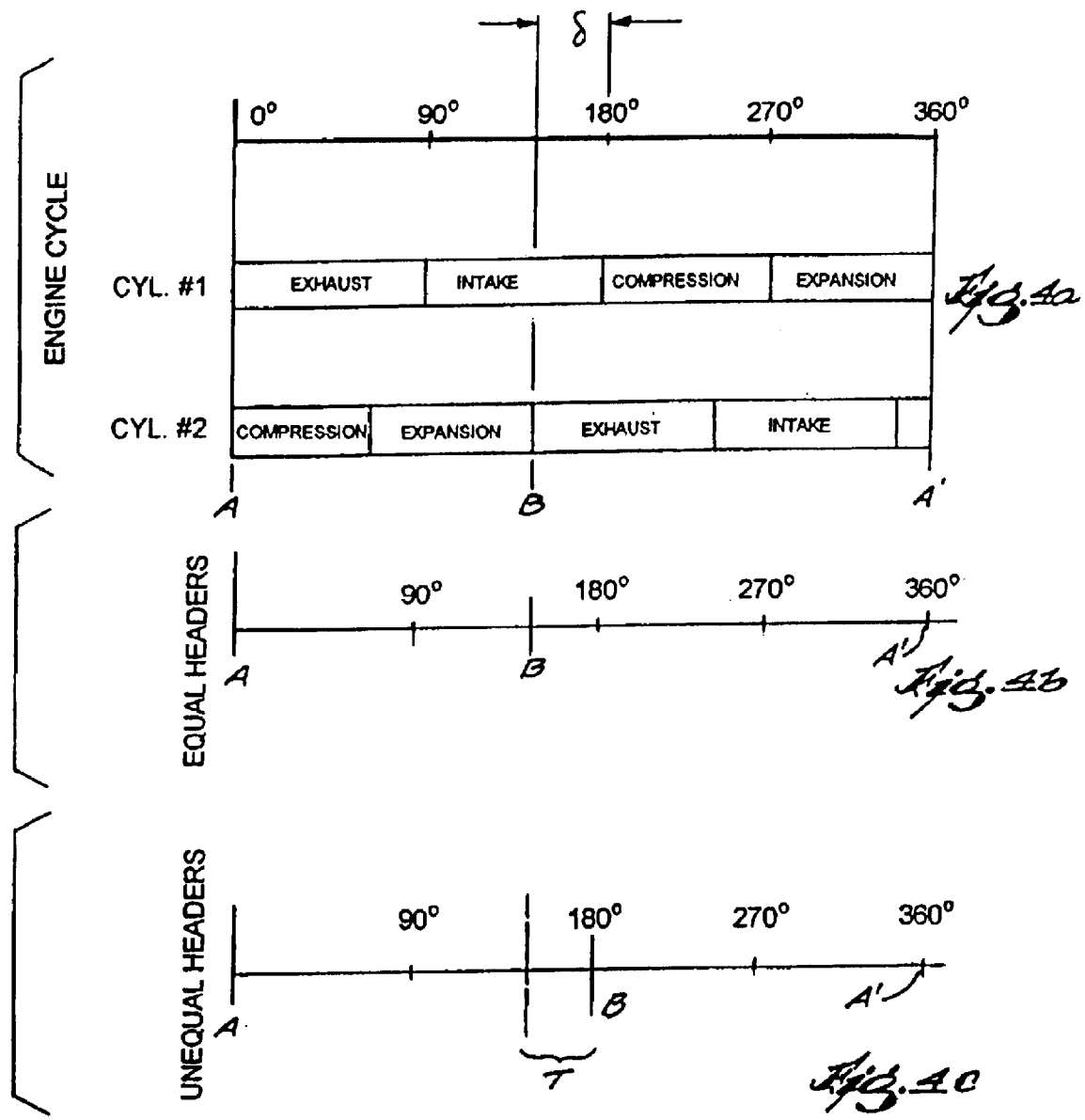

MOTORCYCLE EXHAUST SYSTEM

FIELD OF THE INVENTION

The invention relates to motorcycles, and more specifically, to motorcycles having exhaust systems.

BACKGROUND OF THE INVENTION

Known motorcycles include four-stroke internal combustion engines that include pistons reciprocating within cylinders defining combustion chambers. The pistons each execute four strokes for each cycle of the engine. The strokes are compression, expansion, exhaust, and intake. The piston moves in a first direction during the compression and exhaust strokes, and in a second opposite direction during the expansion and intake strokes.

Exhaust systems are connected to the cylinders in order to direct the exhaust and reduce engine noise. Exhaust systems usually include a muffler and headers, or exhaust pipes, that are connected between the cylinders and the muffler. When an exhaust valve opens to begin the exhaust stroke of the piston, pressure pulses are created by the burst of high-pressure gas that suddenly escapes out of the combustion chamber and into the exhaust system. The pressure pulses, or sound waves, travel through the headers to the muffler where the amplitudes of the pressure pulses are reduced.

SUMMARY OF THE INVENTION

The present invention is directed to an exhaust system that improves engine power by receiving pressure pulses from an engine at uneven time intervals and delivering the pressure pulses to a common muffler at even time intervals. By delivering the pressure pulse to the muffler at even time intervals, the torque and power of the engine is increased for a range of engine speeds. In addition, a smaller capacity muffler may be used, because when the pulses reach the muffler at evenly-spaced time intervals, the pressure pulses evenly share the muffler.

One embodiment of the present invention is an exhaust system for a four-stroke engine. The engine includes first and second cylinders capable of producing pressure pulses. The engine includes a 360 degree cycle that begins with a first pressure pulse produced by the first cylinder, includes a second pressure pulse produced by the second cylinder, and ends with a next consecutive pressure pulse produced by the first cylinder. The phase difference between the production of the first pressure pulse and the production of the second pressure pulse is substantially less than 180 degrees. The exhaust system includes a muffler and first and second headers. The first header conducts the first pressure pulse from the first cylinder to the muffler, and the second header conducts the second pressure pulse from the second cylinder to the muffler. The first and second headers are configured such that, while the engine operates in a range of engine speeds, the first and second pressure pulses enter the muffler substantially 180 degrees out of phase with each other to improve the power of the engine within the range of normal engine operating speeds.

Another embodiment of the invention includes a method for designing an exhaust system for a motorcycle including an engine. The method includes determining a first phase difference between the production of a first pressure pulse and the production of a second pressure pulse, and configuring first and second headers to maximize a phase difference between the first and second pressure pulses at the muffler for a range of engine speeds such that, while the engine operates in the range of engine speeds, the first and second pressure pulses enter the muffler at substantially 180 degrees out of phase with each other to increase the power of the engine within the range of engine cycle speeds.

One exhaust system that embodies the invention is used with a four-stroke 45 degree V-twin engine having first and second cylinders that generate exhaust pulses at uneven time intervals with respect to each other. The exhaust system includes a muffler and first and second exhaust pipes that communicate between the mufflers and the first and second cylinders, respectively. The first and second pipes are sized and shaped to deliver the exhaust pulses to the muffler at even time intervals with respect to each other in a selected range of normal operating speeds.

Other features and advantages of the invention will become apparent to those skilled in the art upon review of the following detailed description, claims, and drawings.

BRIEF DESCRIPTION OF THE DRAWINGS

FIG. 1 is a side view of a motorcycle that includes an exhaust system embodying the invention.

FIG. 2 is a perspective view of exhaust headers having substantially equal lengths.

FIG. 3 is an enlarged perspective view of the exhaust headers shown in FIG. 1.

FIG. 4a is a schematic illustration of the engine cycle of the motorcycle of FIG. 1.

FIG. 4b is a schematic illustration of pressure pulses delivered to a muffler by the exhaust headers of FIG. 2.

FIG. 4c is a schematic illustration of the pressure pulses delivered to the muffler by the exhaust headers of FIG. 3.

Figure 5:
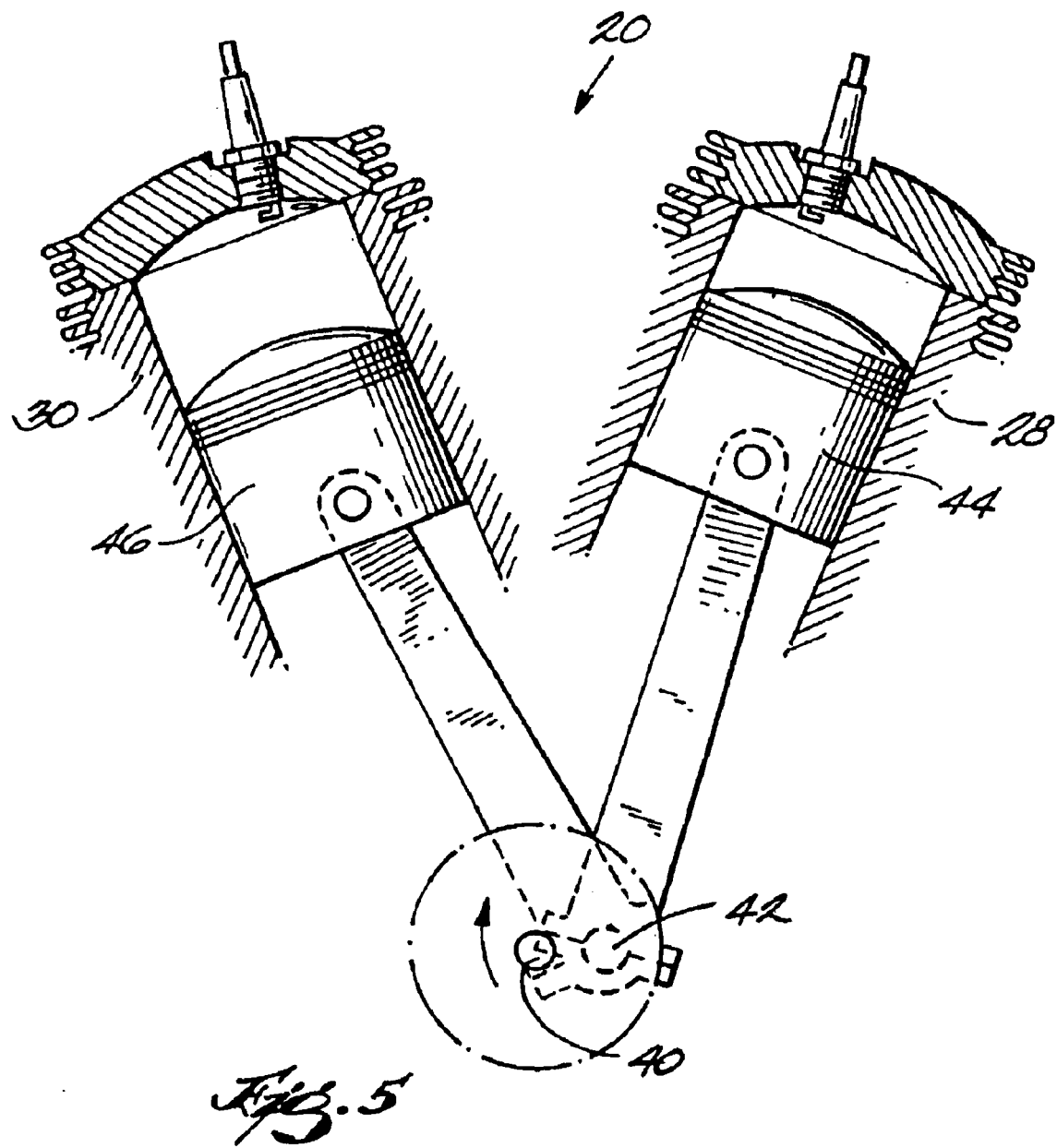
FIG. 5 is a schematic view of an engine of the motorcycle of FIG. 1

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION

FIG. 1 illustrates a motorcycle 10 including a frame 12, front and rear wheels 14, 16, a seat 18, and an engine 20. The front and rear wheels 14, 16 rotate with respect to the frame 12 and support the frame 12 above the ground. The engine 20 is mounted to the frame 12 and drives the rear wheel 16 through a transmission 22 and drive belt 24. The seat 18 is mounted to the frame 12 and a fuel tank 26 is integrally formed with the frame 12.

Although the illustrated engine 20 is an air-cooled four stroke 45 degree V-twin engine having first and second cylinders 28, 30, the invention may be embodied in other types of engines, such as multi-cylinder engines of either the water-cooled or air-cooled variety. Additionally, although the drawings illustrate the first and second cylinders 28, 30 as the front and rear cylinders, respectively, the invention may be embodied in an engine that has the cylinders positioned side-by-side rather than one behind the other. The invention may also be used in other uneven firing engines other than the 45 degree V-twin engine. The term "uneven firing," as used herein, means that the cylinders fire at unevenly spaced intervals during rotations of the crankshaft (e.g., at 315 degrees of crankshaft rotation and again at 405 degrees of crankshaft rotation), as compared to even firing engines which fire at evenly spaced intervals (e.g., every 360 degrees of crankshaft rotation).

As best shown in FIG. 5, the engine 20 includes a crankshaft 40 rotatably mounted within the engine 20. The crankshaft 40 includes a crank pin 42 and first and second pistons 44, 46. The first piston 44 is rotatably coupled to the crank pin 42 and reciprocable within the first cylinder 28 and the second piston 46 is rotatably coupled to the crank pin 42 and reciprocable within the second cylinder 30.

The motorcycle 10 includes an exhaust system 32 that directs the exhaust and reduces the noise created by the engine 20. The exhaust system 32 includes a muffler 34 and first and second exhaust pipes, or headers 36, 38. The first header 36 is connected between the first cylinder 28 and the muffler 34, and the second header 38 is connected between the second cylinder 30 and the muffler 34. The headers 36, 38 receive pressure pulses A, B (FIGS. 4a, 4b, and 4c) generated by the cylinders 28, 30 at uneven time intervals and deliver the pressure pulses A, B to the muffler 34 at even time intervals.

FIG. 4a is a schematic representation of a 360 degree engine cycle. It should be noted that, in the illustrated embodiment, the engine cycle includes two full rotations of the crankshaft (not shown). Therefore, the 360 degree engine cycle includes 720 degrees of crankshaft rotation.

The engine cycle begins with a first pressure pulse A created by the first cylinder 28 and ends with a next consecutive pressure pulse A' generated by the first cylinder 28. The engine cycle includes a second pressure pulse B generated by the second cylinder 30. For the purpose of this discussion, each pressure pulse A, B is considered "generated" at the beginning of the exhaust stroke within each respective cylinder 28, 30. In the illustrated embodiment, the second pressure pulse B is created 157.5 degrees out of phase with the first pressure pulse A as dictated by the uneven firing of the 45 degree V-twin engine 20 (i.e., the first pressure pulse A at 0 degrees and the second pressure pulse B at 157.5 degrees). Alternatively, an even firing engine would create the pressure pulses at a maximum 180 degree out of phase relationship. The difference between the maximum out of phase relationship (i.e., 180 degrees) and the out of phase relationship determined by the uneven firing engine 20 (i.e., 157.5 degrees) is shown schematically as phase gap δ.

FIG. 4b schematically represents the phase relationship between the pressure pulses A, B reaching the muffler 34 after travelling through the headers 36, 38 illustrated in FIG. 2. The headers 36, 38 illustrated in FIG. 2 have equal cross-sectional areas and equal lengths, causing the pressure pulses A, B to travel at equal speeds and to maintain their phase relationship throughout the entire length of the headers 36, 38. This phase difference remains constant for any engine speed.

In contrast, FIG. 4c schematically represents the phase relationship between the pressure pulses A, B reaching the muffler 34 after travelling through the headers 36, 38 illustrated in FIGS. 1 and 3. The headers 36, 38 illustrated in FIGS. 1 and 3 have equal cross-sectional areas (e.g., 1.5 square inches in the illustrated embodiment) but have unequal lengths. Specifically, the illustrated first header 36 is 17 inches long and the illustrated second header 38 is 22.1 inches long such that the second pulse B travels through a greater distance than the first pressure pulse A. The greater distance of travel creates a lag for the second pressure pulse B, thereby increasing the phase relationship at the muffler 34. The same would hold true if the headers 36, 38 had equal lengths, but the first header 36 had a smaller cross-sectional area than the second header 38.

It should be noted that because of the perspective from which FIGS. 2 and 3 are drawn, it is difficult to visually distinguish that the headers in FIG. 3 have equal lengths, and that the headers in FIG. 2 have unequal lengths. Irregardless, FIG. 3 illustrates headers having equal lengths and FIG. 2 illustrates headers having unequal lengths.

Unlike the headers 36, 38 which have equal cross-sectional areas and lengths, the headers 36, 38 with unequal cross-sectional areas or lengths do not have a constant phase relationship at the muffler 34. Instead, the phase relationship at the muffler 34 is dependent upon the engine speed. The difference in header lengths compensates for δ so that the pressure pulses A, B reach the muffler 180 degrees out of phase for a specific engine speed.

For example, when the engine 20 is running at 5000 rpm, or 2500 engine cycles per minute as illustrated in FIG. 4c, δ defines a specific time interval T. The increased length of the second header 38 extends the travel distance for the second pressure pulse B to delay the second pressure pulse B for a period of time equal to T. As the engine 20 runs slower than 2500 engine cycles per minute, T increases and the phase relationship at the muffler 34 decreases from 180 degrees. As the engine speed increases from 2500 engine cycles per minute, T decreases and the phase relationship at the muffler 34 increases from 180 degrees.

Therefore, by knowing the phase difference δ and the preferred operating speed of the engine 20 (e.g., 2500 engine cycles per minute), the power at the operating speed can be increased by configuring the headers 36, 38 so that second pressure pulse B is delayed by time T and the pressure pulses A, B reach the muffler 180 degrees out of phase when the engine operates at the preferred operating speed. The second pressure pulse B can be delayed by increasing the relative length of the second header 38 compared to the first header 36, by increasing the cross-sectional area of the second header 38 relative to the first header 36, or by modifying the cross-sectional area and the length such that the second pressure pulse B is delayed the required amount of time T.

We claim:

1. An exhaust system for a four-stroke engine including a first cylinder capable of producing pressure pulses and a second cylinder capable of producing pressure pulses, the engine having a 360 degree cycle that begins with a first pressure pulse produced by the first cylinder, includes a second pressure pulse produced by the second cylinder, and ends with a next consecutive pressure pulse produced by the first cylinder, the phase difference between the production of the first pressure pulse and the production of the second pressure pulse being substantially less than 180 degrees, the exhaust system comprising:

a muffler;

a first header connected to the muffler and adapted to receive the first pressure pulse from the first cylinder and to direct the first pressure pulse to the muffler; and a second header connected to the muffler and adapted to receive the second pressure pulse from the second cylinder and to direct the second pressure pulse to the muffler;

wherein the first and second headers are configured to deliver the first and second pressure pulses to the muffler substantially 180 degrees out of phase with each other while the engine operates in a selected range of normal engine operating speeds, wherein the phase difference between the production of the first pressure pulse and the production of the second pressure pulse is approximately 157.5 degrees.

2. The exhaust system of claim 1, wherein the range of normal engine operating speeds is between 2000 and 2500 cycles per minute.

3. The exhaust system of claim 1, wherein the engine includes a crankshaft rotatably mounted within the engine, wherein the crankshaft rotates twice per engine cycle, wherein the crankshaft includes a crank pin, wherein the engine includes a first piston that is rotatably coupled to the crank pin and reciprocable within the first cylinder and a second piston that is rotatably coupled to the crank pin and reciprocable within the second cylinder.

4. The exhaust system of claim 3, wherein the first cylinder defines a first axis and the second cylinder defines a second axis, and wherein the first and second axes define an included angle of 45 degrees.

5. The exhaust system of claim 1, wherein the length of the first header is substantially different than the length of the second header.

6. The exhaust system of claim 1, wherein the first header has a substantially different cross-sectional area than the second header.

7. The exhaust system of claim 1, wherein the pressure pulses are sound waves.

8. A method for designing an exhaust system for a motorcycle including an engine having a first cylinder capable of producing pressure pulses and a second cylinder capable of producing pressure pulses, the engine having a 360 degree cycle that begins with a first pressure pulse produced by the first cylinder, includes a second pressure pulse produced by the second cylinder, and ends with a next consecutive pressure pulse produced by the first cylinder, the method comprising:

determining a first phase difference between the production of the first pressure pulse and the production of the second pressure pulse, wherein the phase difference between the production of the first pressure pulse and the production of the second pressure pulse is approximately 157.5 degrees; and configuring first and second headers such that, while the engine operates in a selected range of engine speeds, the first and second pressure pulses enter the muffler substantially 180 degrees out of phase with each other to increase the power of the engine within the range of engine cycle speeds.

* * * * *